July 25, 1950 R. O. BRADLEY 2,516,179
PHOTO AMPLIFIER
Filed Oct. 2, 1948 2 Sheets-Sheet 1
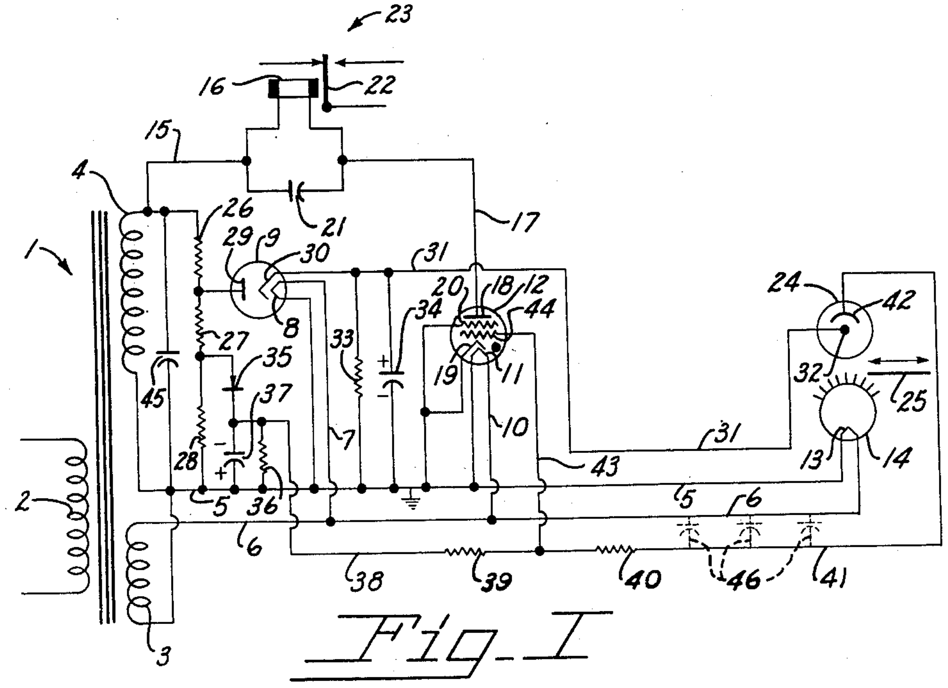
Fig. I
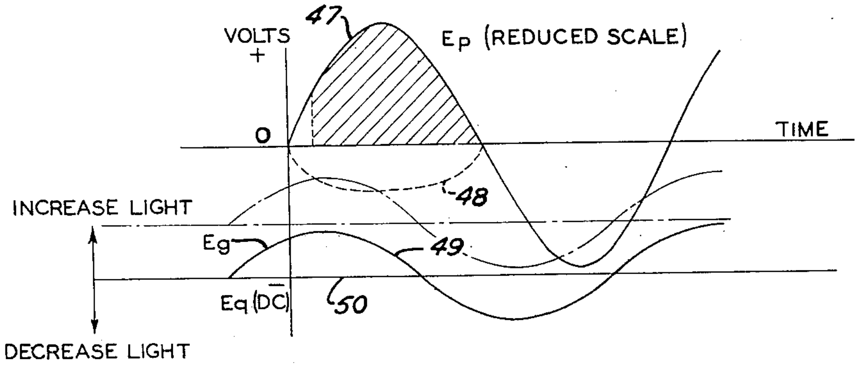
Fig. II
INVENTOR.
Robert O. Bradley
BY
Marshall, Marshall and Leonard
ATTORNEYS

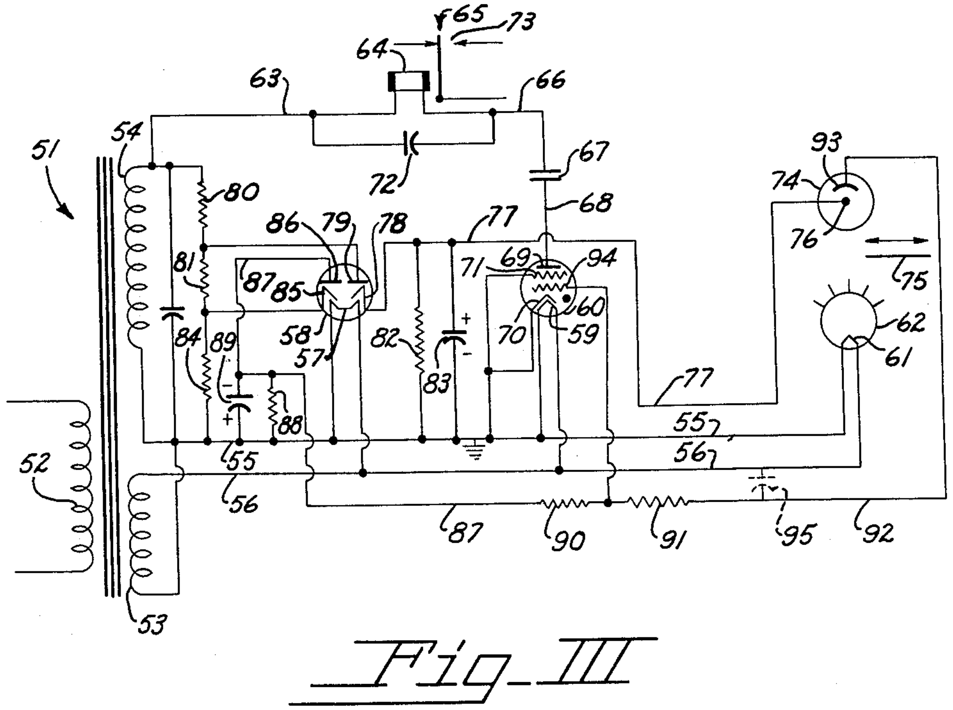
Fig. III
INVENTOR.
Robert O. Bradley
BY
Marshall, Marshall and Leonard
ATTORNEYS Patented July 25, 1950

2,516,179

UNITED STATES PATENT OFFICE 2,516,179

PHOTOAMPLIFIER

Robert O. Bradley, Toledo, Ohio, assignor to Toledo Scale Company, Toledo, Ohio, a corporation of New Jersey Application October 2, 1948, Serial No. 52,445

3 Claims. (Cl. 250—214)

This invention relates to electronic amplifiers and in particular to an amplifier suitable for controlling the operation of an electrical relay according to the quantity of light incident upon a photoelectric cell.

Many electronic amplifiers have been constructed for use with photoelectric cells. In general, these amplifiers have suffered from one or more defects which have limited their field of usefulness as control elements. Among these defects is the fact that the output current of the amplifier varies proportionally to the light incident upon the photoelectric cell and thus promotes a chattering operation of the relay as the light intensity approaches or recedes from that intensity at which the relay operates. Another defect is the sensitivity of such amplifiers to extraneous voltages that may be induced in the leads connecting the photoelectric cell to the amplifier.

The principal object of this invention is the provision of an electronic amplifier the output current of which is substantially zero until a selected light intensity is reached at which time the output current suddenly rises to substantially its maximum value and remains at such value regardless of further increases in the intensity of the light incident upon the photoelectric cell.

Another object of the invention is to utilize voltages induced in the leads connecting the photoelectric cell to the amplifier as a means of securing sudden transition from zero current condition to full current condition as the intensity of the light incident upon the photoelectric cell increases continuously from a low value to a high value.

More specific objects and advantages are apparent from the following description in which reference is made to the accompanying drawings.

According to the invention, the leads connecting a photoelectric cell to its amplifier are carried in the same conduit or cable as the leads supplying current to a bulb serving as a light source for the photocell. The amplifier is conditioned so that the voltages induced in the photoelectric cell leads because of their proximity to the light source leads are of such phase and amplitude as to induce sudden changes in the output of the amplifier as the input from the photoelectric cell changes in a continuous manner.

An amplifier constructed to operate according to the invention is illustrated schematically in the accompanying drawings.

In the drawings:

Figure I is a schematic circuit diagram of the improved amplifier.

Figure II is a diagram in the nature of an oscillogram indicating the instantaneous voltages on certain elements of the amplifier as functions of time.

Figure III is a schematic diagram of a slightly modified amplifier constructed according to the invention.

These specific figures and the accompanying description are intended merely to illustrate the invention but not to impose limitations on the claims.

The amplifier shown schematically in Figure I has a power transformer 1 of which a primary winding 2 is connected to a suitable source of power supply while a low voltage secondary winding 3 supplies filament power for the amplifier and light source. A high voltage secondary winding 4 supplies high voltage power for the amplifier. One side of the low voltage secondary winding 3 is connected to a grounded lead 5 while the other terminal of the low voltage winding 3 is connected to a lead 6. Current supplied from the low voltage winding 3 flows through the lead 6 and a branch lead 7 to a filament 8 of a rectifier tube 9 the other side of which is connected to the grounded lead 5. Current also flows from the lead 6 through another branch lead 10 to a filament 11 of a grid controlled gas discharge tube 12 and back to the grounded lead 5. In addition current flows through a continuation of the lead 6 extending through a conduit and leading to a filament 13 of a light source bulb 14. The other side of the filament 13 is connected to the ground wire 5.

The high voltage secondary winding 4 has one terminal grounded to the ground lead 5 and its other terminal connected through a lead 15, a relay coil 16, and lead 17 to an anode 18 of the grid controlled discharge tube 12. The discharge tube 12 has its cathode 19 and its screen grid 20 connected directly to the grounded lead 5 thus completing the anode circuit of the discharge tube 12. Since, when the discharge tube 12 is conducting, the current flow through the anode circuit including the relay coil 16 consists of half cycle pulses, a condenser 21 is connected in parallel with the relay coil 16 to minimize or eliminate any chattering of an armature 22 cooperating with the relay coil 16. The relay armature 22 controls a set of contacts 23 which may be connected to control other equipment.

A photoelectric cell 24 is arranged to receive light from the light source bulb 14 as long as a light intercepter 25 connected to a condition responsive apparatus or mechanism that initiates the control does intercept the light from the light bulb 14. To supply voltage to the photocell 24 a voltage divider comprising serially connected resistors 26, 27 and 28 is connected across the high voltage secondary winding 4. The junction between the resistors 26 and 27 is connected to an anode 29 of the rectifier tube 9. A cathode 30 of the rectifier tube 9 is connected through a lead 31 which extends through the conduit and is connected to an anode 32 of the photocell 24. The rectifier tube 9 operates as a half-wave rectifier. Its output, the voltage supplied to the lead 31, is smoothed by a parallel combination of a resistor 33 and condenser 34 so that substantially constant direct current voltage is maintained between the rectifier output lead 31 and the grounded lead 5.

The junction between the voltage divider resistors 27 and 28 is connected through a disk type rectifier 35 and the parallel combination of a resistor 36 and condenser 37 to the grounded lead 5. The rectifier 35 is connected so that the potential at the junction between the rectifier 35 and the resistor 36, which junction is connected to a bias lead 38, is maintained at a negative voltage with respect to the grounded lead 5. The bias lead 38 is connected through high resistance resistors 39 and 40 and a lead 41 to a cathode 42 of the photoelectric cell 24. The junction between the resistors 39 and 40 is connected through a lead 43 to a control grid 44 of the gaseous discharge tube 12.

To minimize the effects of transients, both those that are transmitted from the power supply source through the primary winding 2 and those that result from the start of conduction of the gaseous discharge tube 12, a small condenser 45 is connected across the high voltage secondary winding 4.

In this circuit as long as no light from the light source 13 is incident upon the photocell 24 the resistance to current flow of the photoelectric cell 24 is much greater than the resistance of the resistors 39 and 40. As a result, the potential of the control grid 44 is maintained at a sufficiently negative potential that no current may flow through the gas discharge tube 12 and, therefore, no current flows through the relay coil 16. As the light intercepter 25 moves away from the light path so that light reaches the photocell 24 its resistance to current flow decreases and the resulting increase in current flowing through the resistors 39 raises the potential of the control grid 44 until finally current flow through the discharge tube 12 is no longer prevented and the relay is thereupon energized.

A gas discharge tube, such as the tube 12, has the characteristic that once current flow is established between its anode and cathode its control grid no longer exercises control of the flow of current. The anode current flow may be interrupted only by reducing the anode potential with respect to the cathode to zero or negative values. In this circuit the anode 18 is supplied without rectification from the high voltage winding 4 of the transformer. It is thus supplied with alternating voltage and for a half cycle of each complete cycle is driven negative with respect to the cathode so as to interrupt the anode current flow and permit the control grid 44 to regain control should its potential increase in a negative direction so as to call for zero current flow through the tube.

It is desirable in the interest of securing the best operating conditions for the relay that the current flow through the relay be substantially zero until such time as it is required to close and that then the current should increase suddenly to its maximum value or substantially its maximum value and remain at such value until the relay is to be opened. This is accomplished in this amplifier since the lead 41 the potential of which varies according to the current flow through the photoelectric cell 24 is included in the same conduit as the lead 6 supplying alternating current to the light source bulb 14. Since the lead 6 carries alternating current voltage and is in proximity to the lead 41, the stray capacity between these leads indicated by the dotted condensers 46 induces an alternating current voltage in the lead 41, which voltage leads in phase the voltage output of the high voltage winding 4. This capacitively induced voltage serves to raise the grid potential of the control grid 44 during the early part of each cycle and to reduce the voltage during the middle and latter part of the cycle. This effect is great enough so that the grid controlled tube 12 "fires" (establish anode current flow) near the start of the positive half cycle of the anode voltage if it is to be established at all during that half cycle. Therefore, the discharge tube 12 either passes no current or passes current during substantially all of the half cycle.

The phase relationships and magnitudes of the various voltages existing in the amplifier and contributing to this result are shown diagrammatically in Figure II. In this figure a sine curve 47 represents the voltage applied to the anode 18 of the discharge tube 12 as long as no current flows through the tube 12. The ordinates of this curve 47 represent the instantaneous voltages applied to the tube and the curve is drawn at a reduced scale with respect to the other curves of the diagram. As long as no current flow has been established through the tube and the potential of its grid is held sufficiently negative no current will flow even though a positive plate potential exists. The instantaneous grid potential required to prevent anode current flow is indicated by a dotted line 48. The potential applied to the control grid 44 is indicated by a sine curve 49 the axis 50 of which is displaced negatively with respect to the zero voltage axis of the anode current voltage curve 47. The D. C. voltage applied to the grid 44 and represented in Figure II by the distance between the zero voltage axis and the axis 50 of the curve 49 is determined by the amount of light incident on the photoelectric cell 24. As long as there is no light the grid is biased negatively according to the voltage developed by the dry disk rectifier 35. As the light on the photoelectric cell 24 is increased the average potential of the control grid 44 rises and may actually become positive with respect to the potential of the ground lead 5 represented by the zero voltage axis of Figure II. The alternating component of grid voltage represented by the sine curve 49 results from the voltage induced by the capacity between the leads 6 and 41. This alternating component remains substantially constant and is displaced in phase ahead of the anode voltage wave 47 by an amount determined by the relative magnitude of the resistances 39 and 40 and the interlead capacitances 46.

As the light incident on the photoelectric cell 24 increases and the distance between the zero voltage axis and the average grid potential represented by the line 50 decreases a point is finally reached at which the sine curve 49 becomes tangent to or intersects the dotted curve 48 representing the critical grid potential. When these curves become tangent or cross, anode current is established through the grid controlled discharge tube 12. From the relative shape of the curves shown in Figure II it may be seen that the curves first touch each other soon after the anode voltage becomes positive and long before it reaches its maximum value. In this arrangement the anode current through the tube is zero until the curves become tangent and then it suddenly increases to a value represented by the shaded area between the anode voltage curve 47 and the zero axis. Any further increase in light on the photoelectric cell causes a slight increase in anode current since the first intersection of the curves 48 and 49 occurs somewhat earlier in the cycle.

This arrangement provides substantially "snap action" insofar as the relay coil 16 is concerned because the current flow through the relay coil is either zero or substantially equal to the maximum value that will flow under any conditions. Without the effect of the capacity between the leads 6 and 41 the grid potential represented by the line 50 as the light is increasing first becomes tangent to the critical grid potential curve 48 near the middle of the positive half cycle of the anode voltage wave 47. Under this condition the current flow through the discharge tube changes suddenly from zero to a value equal to half the maximum value of the current that flows when full light intensity is reached. To prevent chattering of the relay this means that the relay must definitely close on half of its rated current. This requires that the relay coil be able to dissipate under operative conditions four times the power that is available when the discharge tube first begins to conduct current.

The amount of capacity introduced within the cable or externally between the leads 6 and 41 is not critical. Too small a capacitance which may result if the cable or conduit is extremely short may result in an inadequate alternating voltage component in the grid control voltage, i. e., the alternating component represented by the curve 49 would be insufficient to match the curvature of the critical grid voltage curve 48 so as to advance the tangent point between these curves ahead of the midpoint of the positive half cycle. If this condition is observed a small additional condenser may be connected between the leads to compensate for the shortness of the conduit.

The presence of extremely long leads or a long conduit increases the capacity between the leads 6 and 41. The only effect of this increase is to increase the amplitude of the alternating component of grid voltage and reduce its phase lead. The reduction in phase lead, however, is not serious since the impedance of the interlead capacitance must become small as compared to the resistance of the resistors 39 and 40 before a substantial loss in circuit efficiency occurs.

Figure III illustrates a possible modification of the amplifier circuit shown in Figure I. This circuit differs from that shown in Figure I in that the thermionic rectifier is substituted for the dry disk rectifier and that a set of normally open contacts controlled by external timing equipment is included in the anode circuit of the gas discharge tube to prevent anode current flow before the cathode of the tube has reached operating temperature.

In other respects the circuits are similar. Thus the circuit shown in Figure III has a power transformer 51 the primary winding 52 of which is connected to a suitable source of power and the secondary windings 53 and 54 of which supply power to the amplifier. The secondary winding 53 has low voltage output and serves as a filament power supply. One terminal of this winding is connected to a grounded lead 55 while its other terminal is connected to a lead 56. A filament 57 of a dual rectifier 58, a filament 59 of a gas discharge tube 60 and a filament 61 of a light source bulb 62 are connected in parallel between the grounded lead 55 and the low voltage power lead 56.

The high voltage winding 54 has one terminal connected to the grounded lead 55 and its other terminal connected to supply current through a lead 63, a coil 64 of a relay 65, a lead 66, normally open contacts 67 of a time-delay relay, otherwise not shown, and a lead 68 connected to an anode 69 of the gaseous discharge tube 60. The discharge tube 60 has its cathode 70 and its screen grid 71 connected directly to the grounded lead 55. Since the anode current flow through the gas discharge tube 60 consists of pulses of current a condenser 72 is connected in parallel with the relay coil 64 to smooth out the fluctuating current and prevent chattering of the relay. The relay 65 has contacts 73 that may be connected to electrically controlled auxiliary equipment.

A photoelectric cell 74 that receives light from the light source 62 as long as an intercepter 75 does not cut off the light has its anode 76 connected through a lead 77 to a cathode 78 of the rectifier tube 58. The cathode 78 cooperates with an anode 79 that is connected to the junction between resistors 80 and 81 of a voltage divider connected across the high voltage winding 54. This rectifier section including the anode 79 and cathode 78 operates as a half-wave rectifier and a filter comprising a resistor 82 and 83 is connected between the lead 77 and the grounded lead 55 to maintain substantially constant voltage on the lead 77.

The voltage divider also includes a resistor 84 and the junction between the resistors 81 and 84 is connected to a cathode 85 of a second section of the rectifier tube 58. An anode 86 cooperating with the cathode 85 is connected to a bias lead 87 and also through a parallel combination of a resistor 88 and condenser 89 to the grounded lead 55. This last described rectifier section serves to maintain bias voltage, i. e., negative voltage, on the lead 87. The lead 87 is connected through high resistance resistors 90 and 91 and a lead 92 to a cathode 93 of the photoelectric cell 74. Furthermore, the midpoint of junction between the resistors 90 and 91 is connected to a control grid 94 of the gas discharge tube 60. As in the preceding circuit the leads 56 and 92 along with the leads 55 and 77 are carried through a conduit and the interlead capacitance between the leads 56 and 92, represented by the dotted condenser 95, supplies an alternating current component to the grid voltage applied to the control grid 94 so that current flow through the gaseous discharge tube 60 is initiated near the start of the positive half cycle if any current is to flow during that half cycle.

This circuit differs from the one first described in that a second section of a thermionic rectifier tube is employed to supply the grid bias for the gaseous discharge tube. Such a rectifier tube is not instant start, i. e., it does not supply bias voltage until its cathode has reached operating temperature. Therefore, there is a time interval immediately after the power transformer is energized during which the gaseous discharge tube is operating without grid bias. It is also necessary, in order to protect the emitting surface of the cathode of the gaseous discharge tube to ensure that the cathode is at operating temperature before current is allowed flow. In the circuit first described, the dry disk rectifier which is instant starting supplies grid bias to prevent conduction through the tube. This condition obtains even though the photocell may receive a maximum amount of light because there is no anode voltage applied to the photocell until the cathode 30 of the rectifier tube reaches operating temperature. By the time anode voltage is supplied to the photocell the gaseous discharge tube has also reached normal operating temperature.

In the second circuit shown in Figure III the pair of normally open contacts 67 are included in the anode circuit of the gaseous discharge tube 60 and these contacts 67 are controlled by a time-delay relay so that the contacts are closed after the cathode of the gas discharge tube 60 has reached normal operating temperature.

This circuit has all of the advantages of the one first described except for the necessity of opening the anode circuit of the gaseous discharge tube during the initial warming up period of the cathodes of the tubes. Each circuit employs a capacitive cooperation between two of its leads either wholly or in part to provide an alternating component of grid voltage that produces a substantially snap action effect in the output circuit of the amplifier as the amplifier input is slowly varied.

Various modifications of the circuit detail may be made without departing from the spirit and scope of the invention.

Having described the invention, I claim:

1. In a relay circuit of the class described, in combination, a grid controlled gaseous discharge tube, a relay that is energized by current flow through the tube, an alternating current source of power for the discharge tube, a photoelectric cell, a direct current voltage supply for the photoelectric cell, circuit means for connecting the photoelectric cell to the grid of the discharge tube, a light source for the photoelectric cell, a lead carrying alternating current for energizing the light source, said lead being located adjacent said circuit means whereby an alternating voltage is induced in said circuit means the phase of which leads the phase of the voltage applied to the anode of the discharge tube.

2. In a relay circuit of the class described, in combination, a grid controlled gaseous discharge tube, a relay that is energized by current flow through the tube, an alternating current source of power for the discharge tube, a photoelectric cell, a direct current voltage supply for the photocell, circuit means for connecting the photoelectric cell to the grid of the discharge tube and to the voltage supply, a light source for the photoelectric cell, a lead carrying alternating current for energizing the light source, said lead and said circuit means being cabled together whereby an alternating voltage is induced in said circuit means.

3. In a relay circuit of the class described, in combination, a gaseous discharge tube having a control grid and an anode, a relay that is connected in circuit with the anode of the tube, a light source, an alternating current source of power for the anode circuit of the tube and the light source, a photoelectric cell, a direct current source of voltage for the cell, said cell and light source being remote from the discharge tube, and a cable having a plurality of conductors serving to connect the photocell to the grid of the discharge tube and the light source to its source of power, the conductor to the light source serving by its presence in the cable to also induce an alternating voltage in the conductor to the photocell effective to control the point of discharge of the discharge tube.

ROBERT O. BRADLEY.

REFERENCES CITED

The following references are of record in the file of this patent:

Gulliksen and Vedder: "Industrial Electronics," 1935 (John Wiley and Sons pub.), pages 65 and 66.